July 9, 1957     C. T. SWENSON     2,798,535
CONTOUR SEAT
Filed Aug. 10, 1955
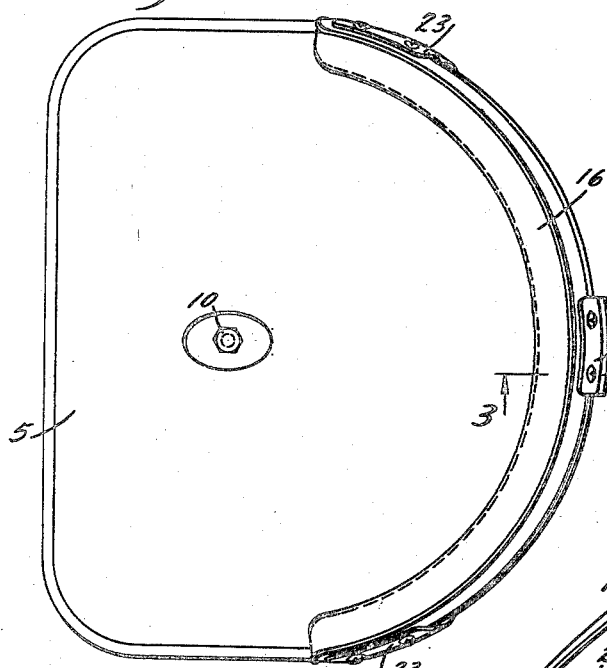
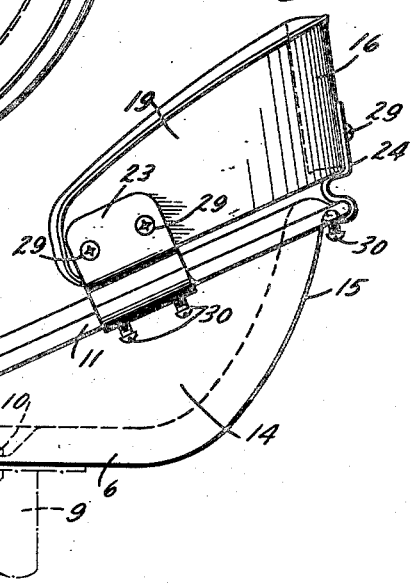
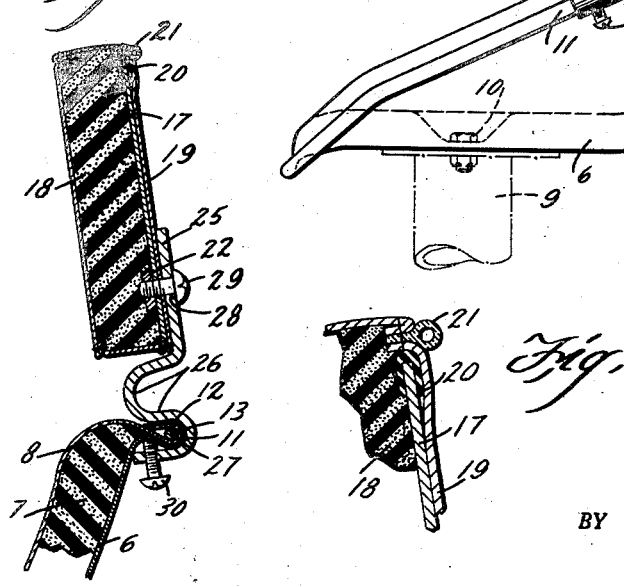
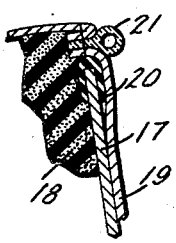
INVENTOR.
Carl T. Swenson
BY Louis O. French
Atty

United States Patent Office 2,798,535
Patented July 9, 1957

2,798,535

CONTOUR SEAT

Carl T. Swenson, Milwaukee, Wis., assignor to Milsco Manufacturing Company, Milwaukee, Wis., a corporation of Wisconsin Application August 10, 1955, Serial No. 527,457

5 Claims. (Cl. 155—131)

The invention relates to seats for trucks or tractors.

One object of the invention is to provide a back rest attachment for a contour seat of the bucket type which may be readily secured to the beaded edge of the seat and extend along the entire back portion thereof.

A further object of the invention is to provide an improved backrest for seats of the character above described.

The invention further consists in the several features hereinafter described and more particularly defined by claims at the conclusion hereof.

In the drawings:

Fig. 1 is a plan view of a seat having a back rest attachment embodying the invention;

Fig. 2 is a side elevation view of the seat;

Fig. 3 is an enlarged sectional view taken on the line 3—3 of Fig. 1;

Fig. 4 is an enlarged sectional view of parts shown in Fig. 3.

Referring to the drawings, a bucket type seat 5 having a metal base portion 6, a cushion 7 secured to said base portion, as by adhesive, and a covering 8 for the cushion is shown. This seat is adapted to be clamped to a fixed support such as 9 by a bolt 10. The base portion or metal body portion 6 of the seat is formed to provide a beaded peripheral edge 11 between which the looped peripheral edge 12 of the covering 8 and a bead forming cord 13 is clamped. It will be noted that the seat is dished to provide partial sides 14 and a lower circular back 15, the edge 11 inclining upwardly from the front of the seat to the back.

A back rest 16 of generally semi-circular form is detachably secured to the beaded edge 11 of the seat.

The back rest 16 includes a sheet metal back plate 17, a cushion 18 of sponge rubber, and a covering 19 of leather or imitation leather formed of separate pieces stitched together at their adjoining edges at the corners of the back rest as shown in Fig. 3. The back plate 17 is bent to a semi-circular form to conform to the curvature of the sides and back of the seat and its upper edge is covered by a channel strip 20 of rubber or rubber-like material to prevent this edge from cutting the outer covering of the back rest pad. Also just above the rubber faced edge of the plate a beaded welt strip 21 of vinyl plastic or other suitable tough flexible material is stitched between the top and back pieces of the covering 19 to form a trim and also a protective edge. At the front end portions and at the back part of the plate 17 spaced pairs of nuts 22, one being shown, are secured as by spot welding to the inner side of said plate.

For mounting the back rest 16 on the seat 5, side brackets 23 and a rear bracket 24 are bolted to the back rest and detachably secured to the beaded edge 11 of the seat. Each of the brackets 23 and 24 comprises a sheet metal plate formed to provide an upper flat portion 25, and a double looped portion 26 which provides a channel 27 to receive a portion of the beaded edge 11 of the seat and also brings the flat portion 25 into a plane which permits the pad portion of the back rest to form in effect a continuation of the pad portion of the seat disposed below it.

The flat portion 25 of each bracket has spaced holes 28 to receive screws 29 that pass through holes in the back covering piece and the back plate 17 and into clamping engagement with the nuts 22.

The lower side of the channel portion 27 of each bracket has spaced set screws 30 in threaded engagement therewith so that they may be screwed into engagement with the lower side of the beaded edge to clamp the channeled portion of the bracket to this edge.

The back rest is applied to the seat by lining up the side brackets 23 with the side edges of the seat and then advancing them along these edges until the channeled or hooked edge of the back or rear bracket 24 engages the beaded edge of the seat. The set screws 30 of the brackets 23 and 24 are then screwed into engagement with the beaded edge of the seat.

I desire it to be understood that this invention is not to be limited to any particular form or arrangement of parts except in so far as such limitations are included in the claims.

What I claim as my invention is:

1. For a cushioned seat having side portions inclining upwardly from its front edge to a curved back portion thereof with an upper peripheral metal edge bead, a cushioned back rest of a contour generally conforming to that of the sides and back of said seat, spaced brackets mounted on said back rest at its opposite sides and back to dispose the lower edge of said back rest adjacent the upper edge of the sides and back of said seat and the front of said back rest in a plane permitting its cushioned portion to form in effect a continuation of the cushioned portion of said seat, and means for clamping said brackets to the said beaded edge of said seat.

2. For a cushioned seat having side portions inclining upwardly from its front edge to the back portion thereof with an upper curved peripheral metal edge bead, a cushioned back rest of a contour generally conforming to that of the sides and back of the seat, spaced brackets mounted on said back rest at its opposite sides and back to dispose the lower edge of said back rest adjacent the upper edge of the sides and back of said seat and the front of said back rest in a plane permitting its cushioned portions to form in effect a continuation of the curved portion of said seat and having channel portions engageable over the beaded edge of said seat, and means mounted in the underside of said channel portions and exterior of said seat for securing said channel portions of said bracket in clamped engagement with said beaded edge.

3. A back rest attachment for bucket type seats comprising a metal back plate of semi-circular form, a cushion mounted on the front face of said plate, a covering for said cushion, a channel shaped strip of yieldable material interposed between the top edge of said plate and the adjacent covering, and seat attaching brackets anchored to said back plate.

4. A back rest attachment for bucket type seats comprising a metal back plate of semi-circular form, a cushion mounted on the front face of said plate, a covering for said cushion, a channel-shaped strip of yieldable material extending over the upper edge of said plate, a beaded trim strip abutting said channel-shaped strip and secured to the upper back edge of the covering, and seat attaching means anchored to said back plate.

5. A back rest for a cushioned bucket type seat having an upper peripheral metal edge bead comprising a cushioned back member of a contour generally conforming to that of the sides and back of the seat, spaced brackets mounted on said back member at its opposite sides and back, each bracket having depending double looped portions depending below said back member and adapted when the lower loop portion straddles the beaded edge of the seat to dispose the front of said back member in a plane permitting its cushioned portion to form in effect a contnuation of the cushioned portion of said seat, and means passing through one of the sides of said lower looped portion for securing said bracket in clamped engagement with said beaded edge.

References Cited in the file of this patent

UNITED STATES PATENTS

| | | |
|---|---|---|
| 2,237,736 | Hill | Apr. 8, 1941 |
| 2,347,538 | Bloomberg | Apr. 25, 1944 |
| 2,672,915 | Jones | Mar. 23, 1954 |